United States Patent
Nair

(10) Patent No.: US 7,502,963 B2
(45) Date of Patent: Mar. 10, 2009

(54) OPTIMIZATION BY USING OUTPUT DRIVERS FOR DISCRETE INPUT INTERFACE

(75) Inventor: Balakrishnan V. Nair, Singapore (SG)

(73) Assignee: Delphi Technologies, Inc., Troy, MI (US)

( * ) Notice: Subject to any disclaimer, the term of this patent is extended or adjusted under 35 U.S.C. 154(b) by 712 days.

(21) Appl. No.: 11/063,035

(22) Filed: Feb. 20, 2005

(65) Prior Publication Data

US 2006/0190767 A1    Aug. 24, 2006

(51) Int. Cl.
    *G06F 11/00* (2006.01)
(52) U.S. Cl. .............................. 714/25; 714/10; 714/30; 324/761; 710/2; 710/31
(58) Field of Classification Search .............. 714/10, 714/24, 30, 37, 25; 324/609, 701, 761; 710/2, 710/16, 29, 31, 36, 38, 107; 370/227
    See application file for complete search history.

(56) References Cited

U.S. PATENT DOCUMENTS

| 5,352,938 | A  | * | 10/1994 | Wise et al. ............... | 327/72  |
| 7,171,542 | B1 | * | 1/2007  | Alfano et al. .............. | 712/38  |
| 7,289,572 | B2 | * | 10/2007 | Cranford et al. ............ | 714/43  |
| 2004/0221078 | A1 | * | 11/2004 | Samuel et al. ............... | 710/107 |
| 2004/0230347 | A1 | * | 11/2004 | Sakurai et al. ............... | 701/1   |

FOREIGN PATENT DOCUMENTS

EP    1213653    6/2002

OTHER PUBLICATIONS

Freescale Semiconductor Inc: "Switch Monitor Interface MC33884/D" Motorola, [Online] 2001, XP002392692 Retrieved from the Internet: URL: http://www.freescale.com/files/analog/doc/data_sheet/MC33884.pdf> [retrieved on Jul. 28, 2006] *the whole document*.
Freescale: "Multiple Switch Detection Interface MC33993" Motorola, [Online] Aug. 2003, XP002392892 Retrieved from the Internet: RUL: http://www.freescale.com/files/analog/doc/data_sheet/MC33993.pdf> [retrieved on Aug. 1, 2006] *the whole document*.

* cited by examiner

*Primary Examiner*—Robert Beausoliel
*Assistant Examiner*—Joseph D Manoskey
(74) *Attorney, Agent, or Firm*—Jimmy L. Funke

(57) ABSTRACT

The invention relates to design optimization of microprocessors using spare driver outputs for discrete input interfaces. An output driver or pre-FET driver is used to interface a discrete input for a microprocessor. To read the discrete interface, a fault detection mechanism of the pre-FET driver or the output driver is used. Monitoring the fault register of the output driver allows the condition of the external switch to be understood. The circuit is able to read either a switched to battery type interface or a switched to ground type interface, thereby eliminating hardware proliferation. The fault register is read through a serial peripheral interface (SPI) bus, thereby removing the need for a dedicated microprocessor pin required for the interface. Toggling the gate in the pre-FET driver interface permits adding diagnostic capability for the discrete input interface.

18 Claims, 7 Drawing Sheets

| Truth Table | | | Configuration |
|---|---|---|---|
| Gate Drive | Fault | Switch Condition | |
| 0 | 0 | OPEN | Switched to Ground type of Interface |
| 0 | 1 | Closed | |
| 1 | 0 | OPEN | Switched to Battery type of Interface |
| 1 | 1 | Closed | |

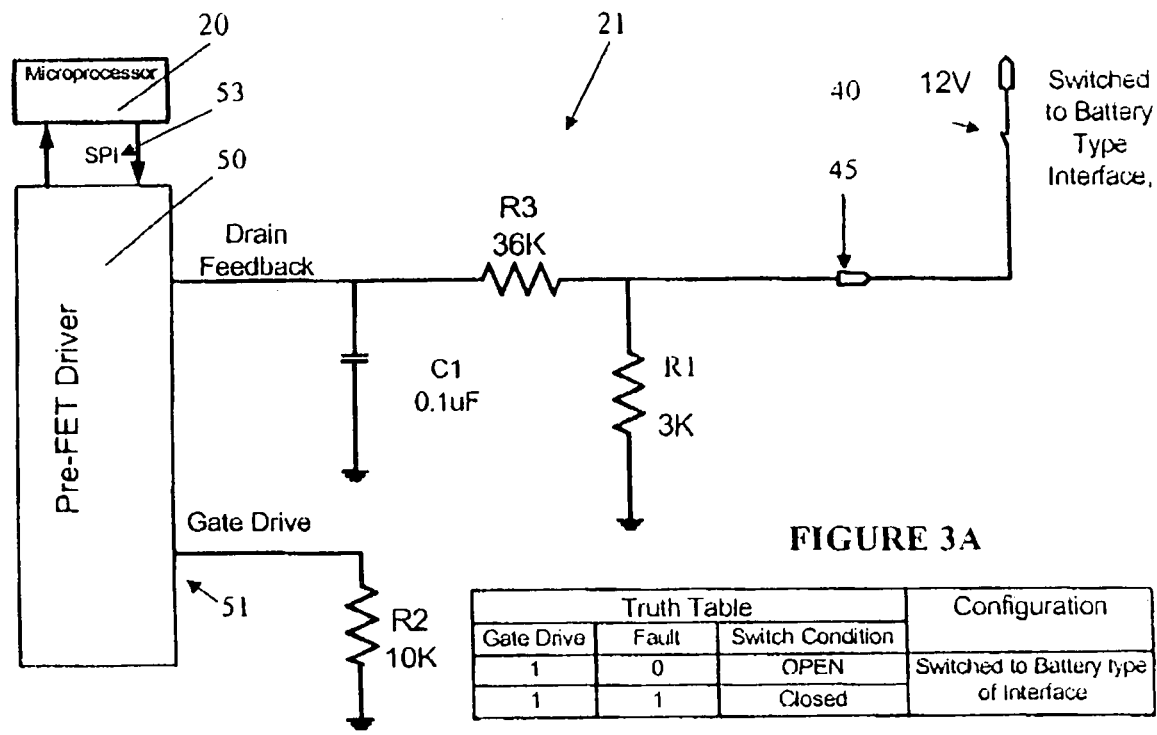

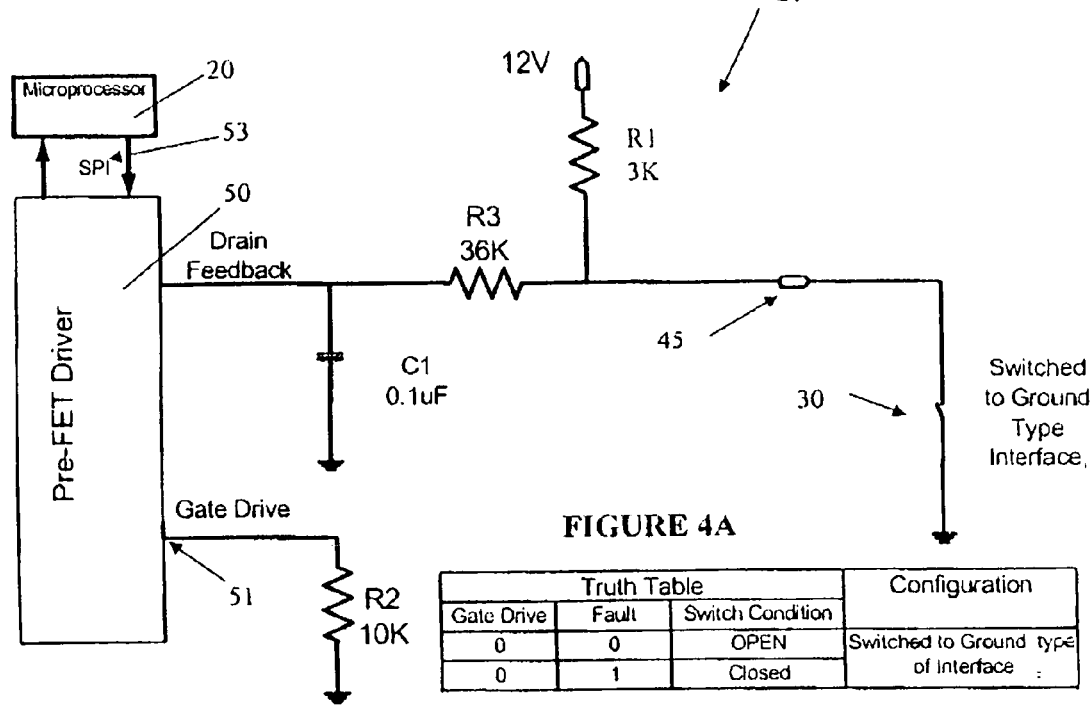

FIGURE 5A

| Truth Table ||| Configuration |
|---|---|---|---|
| Output | Fault | Switch condition | |
| OFF | 0 | Open | Switched to Ground type of Interface |
| OFF | 1 | Closed | |

FIGURE 6A

| Truth Table ||| Configuration |
|---|---|---|---|
| Output | Fault | Switch Condition | |
| OFF | 1 | Open | Switched to battery type of interface |
| OFF | 0 | Closed | |

OPTIMIZATION BY USING OUTPUT DRIVERS FOR DISCRETE INPUT INTERFACE

TECHNICAL BACKGROUND

The present invention relates generally to output drivers used in engine control modules.

BACKGROUND OF THE INVENTION

In a conventional microprocessor controller design, the microprocessor resources are allocated for input, output, and control functions. Occasionally, the microprocessor ports are not sufficient to meet all the input/output port requirements. In these cases, two options are available. The first option entails using one port for multiple functions, resulting in multiple software sets and hardware base models. The second option entails using the next higher end microprocessor that can accommodate all the required functions, thereby adding cost to the design of the microprocessor controller.

Current output drivers and pre-FET (Field Effect Transistor) drivers are used only for output interface. Most designs do not utilize all of the installed output functions for a particular base model microprocessor. Thus, the unused outputs become spares. Spare outputs are present even in designs in which there is a lack of inputs. Introducing fault detection or fault diagnostic capability for discrete inputs with current designs is costly and requires additional microprocessor pins. Additionally, conventional discrete inputs do not have latch capability.

SUMMARY OF THE INVENTION

The invention relates to design optimization of microprocessors and engine control module design using spare driver outputs for discrete input interfaces. An output driver or pre-FET driver is used to interface a discrete input for a microprocessor. To read the discrete interface, a fault detection mechanism of the pre-FET driver or the output driver is used. Monitoring the fault register of the output driver allows the condition of the external switch to be understood. The circuit is able to read either a switched to battery type interface or a switched to ground type interface, thereby eliminating hardware proliferation. The fault register is read through a serial peripheral interface (SPI) bus, thereby removing the need for a dedicated microprocessor pin required for the interface. Toggling the gate in the pre-FET driver interface permits adding diagnostic capability for the discrete input interface.

An advantage of the present invention is the elimination of hardware proliferation, thereby leading to decreased cost.

Another advantage of the present invention is the utilization of a serial peripheral interface to interface the discrete input, thereby saving microprocessor ports without compromising design performance.

In one form thereof, the present invention provides a method for design optimization of an engine control module to eliminate hardware proliferation using a design having outputs with fault detection circuitry, including the steps of: identifying a spare output of an output driver; associating a serial peripheral interface and a desired input with the spare output; and enabling the process to access the fault detection capability of the spare output through the serial peripheral interface to determine an input value.

In another form thereof, the present invention provides a method for design optimization of a processor to eliminate hardware proliferation using a design having outputs with fault detection circuitry, including the steps of: identifying a spare output of a pre-FET driver of the processor; associating a serial peripheral interface and a desired input with the spare output; and enabling the processor to determine an input value based on the fault detection circuitry and the serial peripheral interface of the pre-FET driver.

In yet another form thereof, the present invention provides a processor capable of utilizing output drivers with fault detection capability as input interface including: processing circuitry coupled to a plurality of outputs, at least one of the outputs including fault detection circuitry; a serial peripheral interface coupled to a desired input; a connection between the at least one output having fault detection circuitry and the desired input; and means for determining the value of the desired input based on the serial peripheral interface and the connection.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein:

FIG. 3 is a dedicated discrete interface for a switched to battery type interface for use with a pre-FET driver in accordance with the present invention;

FIG. 3A is a truth table applicable to the circuitry of FIG. 3;

FIG. 4 is a dedicated discrete interface for a switched to ground type interface for use with a pre-FET driver in accordance with the present invention;

FIG. 4A is a truth table applicable to the circuitry of FIG. 4;

FIG. 5A is a truth table applicable to the circuitry of FIG. 5;

FIG. 6A is a truth table applicable to the circuitry of FIG. 6.

Figure 1:
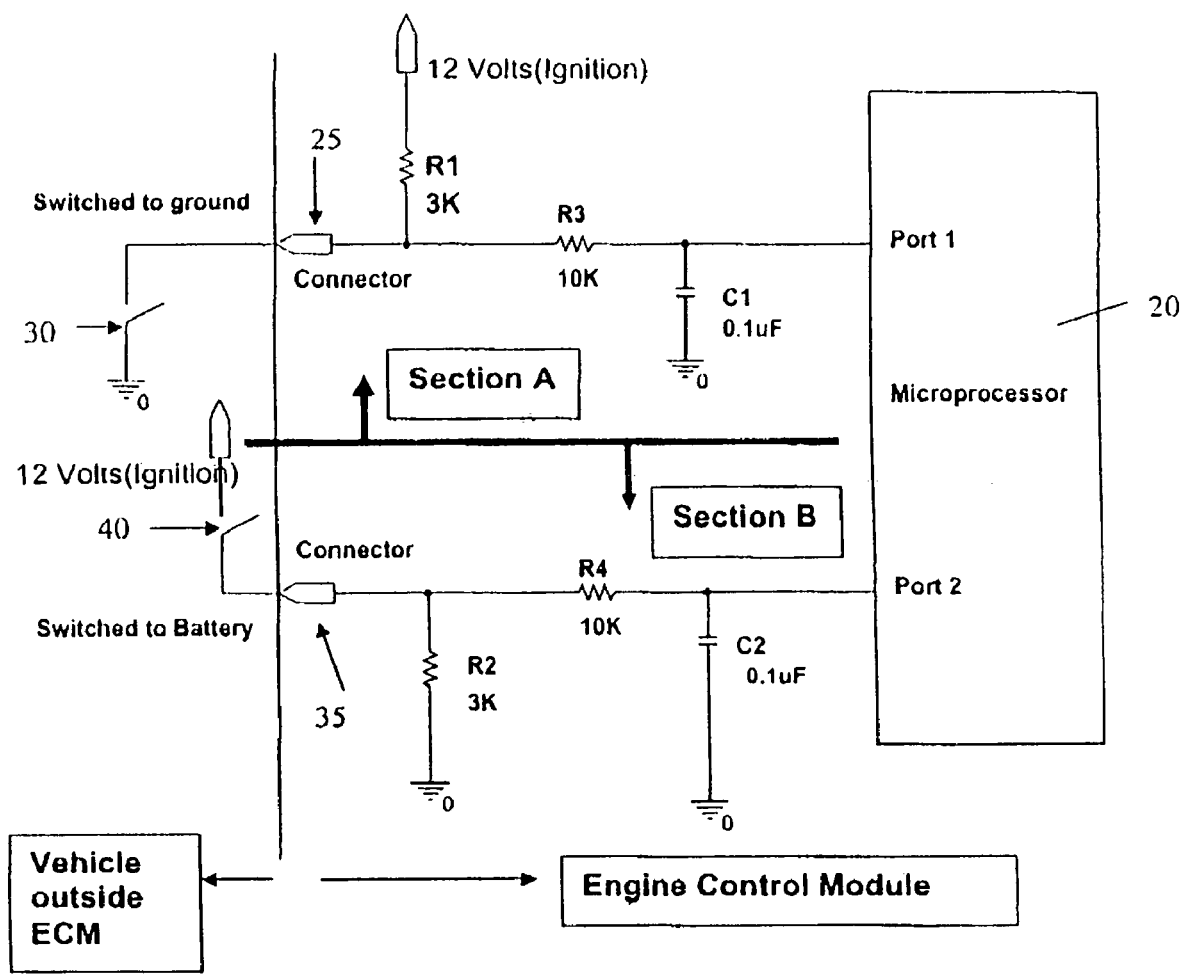
FIG. 1 is a prior art discrete interface illustrating a switched to battery interface and a switched to ground interface.

Corresponding reference characters indicate corresponding parts throughout the several views. Although the drawings represent embodiments of the present invention, the drawings are not necessarily to scale and certain features may be exaggerated in order to better illustrate and explain the present invention. The exemplifications set out herein illustrate embodiments of the invention in several forms and such exemplifications are not to be construed as limiting the scope of the invention in any manner.

DESCRIPTION OF INVENTION

The embodiments discussed below are not intended to be exhaustive or limit the invention to the precise forms disclosed in the following detailed description. Rather, the embodiments are chosen and described so that others skilled in the art may utilize their teachings.

Referring now to FIG. 1, a conventional discrete interface is shown. Ports 1 and 2 of microprocessor 20 are discrete input ports. Section A of FIG. 1 shows the typical interface for a switched to ground type interface. Port 1 of the switched to ground type interface reads "0" if switch 30 is closed and "1" if switch 30 is open. Resistor R3 and capacitor C1 in Section A are used for signal filtering. Connector 25 connects the circuitry shown in Section A to the remainder of the vehicle circuitry outside the engine control module, i.e., switch 30. Section B of FIG. 1 shows the typical interface for a switched to battery type interface. Port 2 of the switched to battery type interface reads "0" if switch 40 is open and "1" if switch 40 is closed. Resistor R4 and capacitor C2 in Section B are used for signal filtering. Connector 35 connects the circuitry shown in Section B to the remainder of the vehicle circuitry outside the engine control module, i.e., switch 40. The discrete interface illustrated in FIG. 1 may be used to detect an opening and closing of a mechanical switch (switch 30 or 40) outside the engine control module (ECM). Once all of the discrete input ports of microprocessor 20 are used, a different hardware configuration called a different base model must be incorporated into the design to implement all the additional input requirements of the controller if any. Different base models implicate different hardware configurations and software sets for different input configurations. This leads to an increase in the number of base models and the cost of manufacturing.

Figures 2, 2A:
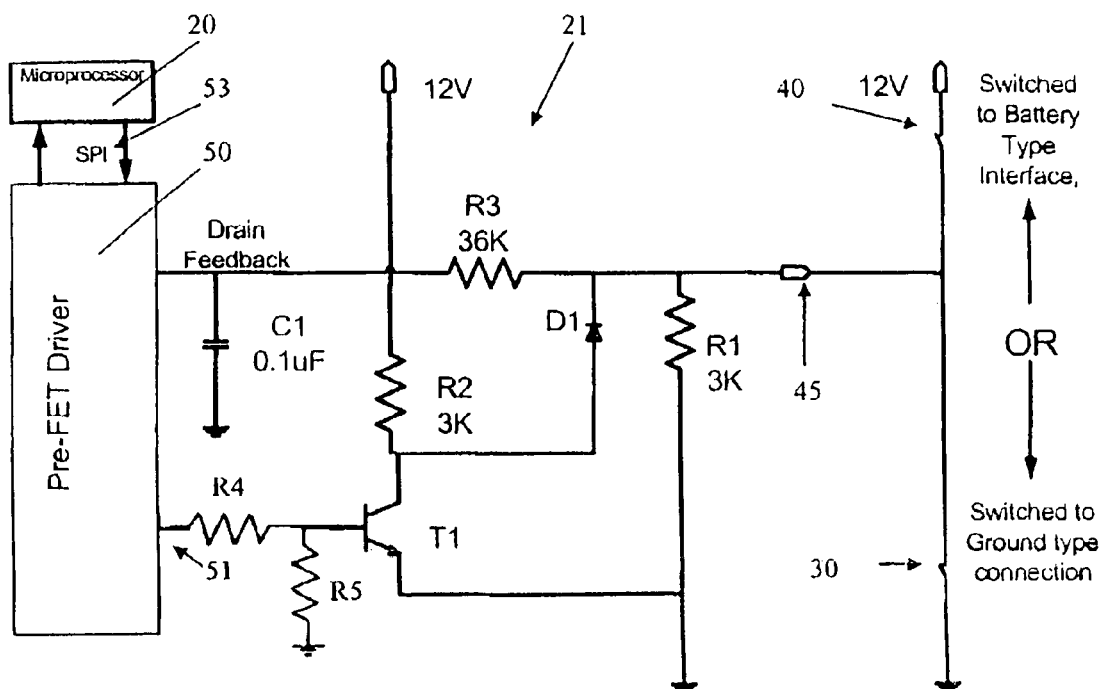
FIG. 2 is a discrete interface to read switched to battery or switched to ground type interface for use with a pre-FET driver according to the present invention.
FIG. 2A is a truth table applicable to the circuitry of FIG. 2.

Referring now to FIG. 2, an interface in accordance with the present invention is shown in which a pre-FET driver output is used to read the discrete input interface. The fault detection circuitry is generally labelled as circuitry 21 throughout the several views. The interface of FIG. 2 is able to read either a switched to battery type interface or a switched to ground type interface, thereby eliminating hardware proliferation. The truth table of FIG. 2A shows the fault register values and gate drive 51 status corresponding to each type of interface. Microprocessor 20 evaluates the switch position based on the fault register value via software. The software may be reprogrammable.

In any particular vehicle application, only one switch configuration will be used. A look-up table in the software indicates to the software in advance what type of interface is expected for that particular vehicle application. For example, a look-up table value of "0" means a switched to ground type interface expected as the input interface, and a look-up table value of "1" means a switched to battery type interface expected as the input interface. Thus, based on the look-up table values, the pre-FET driver gate is driven as "0" for a switched to ground type interface and reads the fault register from the pre-FET driver to identify the switch condition. If the fault register is "0", the switch is not closed. If the fault register is "1", the switch is closed. Similarly, if the look-up table value is "1", it indicates to the software that a switched to battery type interface is expected at the connector interface and the pre-FET gate should be driven as "1". When the pre-FET driver gate is "1" and the fault register is "0", the outside switch is open. If the fault register is "1", the switch is closed to battery. The fault register in all embodiments is always read through a serial peripheral interface bus.

The output of gate drive 51 is set where the fault register will report a "no fault" or "0" status if switch 30 or switch 40 is open. When switch 30 is closed in the switched to ground type interface, the fault register reports a fault or "1" corresponding to the output of gate drive 51 being turned off. When switch 40 is closed in the switched to battery type interface, the fault register reports a fault or "1" corresponding to the output of gate drive 51 being turned on. Microprocessor 20 reads the fault register via serial peripheral interface (SPI) 53 corresponding to the output of gate drive 51 and determines the condition of switch 30 or 40. By reading the fault through SPI 53, the need for an additional microprocessor input port to read the discrete input interface is advantageously eliminated. The discrete input interface of the present invention also advantageously provides latch capability. The latch capability is the built-in feature of any pre-FET driver or an output driver. Once the fault is detected, the fault will be registered in the fault register, and the fault will be cleared only after the microprocessor reads the register via SPI 53. This helps to capture the momentary closing or opening of the outside switch. Connector 45 connects fault detection circuitry 21 to the remainder of the vehicle circuitry outside the engine control module, i.e., switch 30 or 40.

Using the interface of FIG. 2 also advantageously provides added diagnostic capability. For example, for a switched to battery type interface, switch 40 connected outside the interface is either open or it will be shorted to battery. In this configuration, if switch 40 is shorted to ground, toggling gate drive 51 and reading the fault register can detect the short to ground fault and appropriate measures can then be undertaken. Additionally, for a switched to ground type interface, switch 30 connected outside the interface is either open or it will be shorted to ground. In this configuration, if switch 30 is shorted to battery, toggling gate drive 51 and reading the fault register can detect the short to battery fault and appropriate measures can then be undertaken.

FIG. 3 shows a dedicated discrete interface for a switched to battery type interface, the operation of which is substantially similar to that of the switched to battery type interface of FIG. 2. FIG. 3A shows the truth table for the interface of FIG. 3. FIG. 4 shows a dedicated discrete interface for a switched to ground type interface, the operation of which is substantially similar to that of the switched to ground type interface of FIG. 2. FIG. 4A shows the truth table for the interface of FIG. 4.

Figure 5:
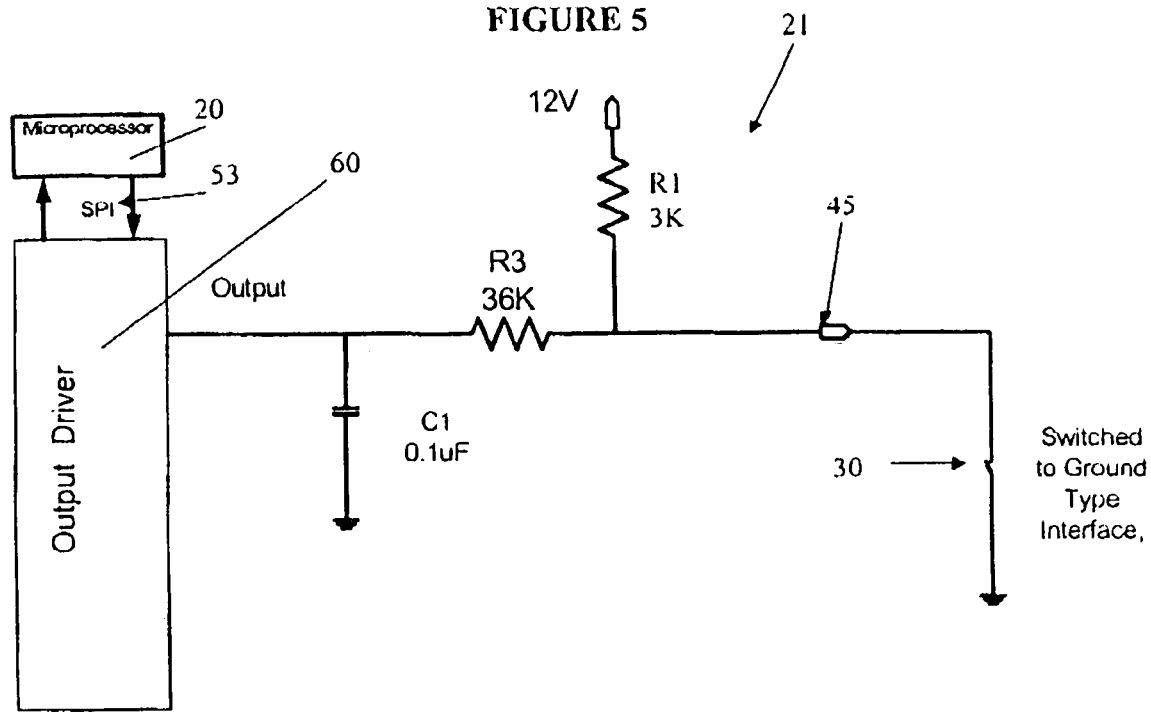
FIG. 5 is a dedicated discrete interface for a switched to ground type interface for use with a low-side output driver in accordance with the present invention.

Referring now to FIG. 5, the proposed method of the present invention can also be used for general purpose output drivers 60. The difference between the pre-FET driver shown in FIG. 2 and the interface shown in FIG. 5 is that, in the output driver interface shown in FIG. 5, the FET is integrated inside the driver IC and there is no drain feedback input available. The feedback is internally derived and only one pin is available per output. When using output driver 60, individual interface circuits need to be used for each switched to battery type interface and switched to ground type interface. FIG. 5 is an illustration of a dedicated discrete interface for a switched to ground type interface using output driver 60. As further explained by FIG. 5A, when the output is off and no fault (fault="0") is reported, switch 30 is read by SPI 53 as being open. In contrast, when a fault is reported (fault="1"), switch 30 is read by SPI 53 as being closed.

Figure 6:
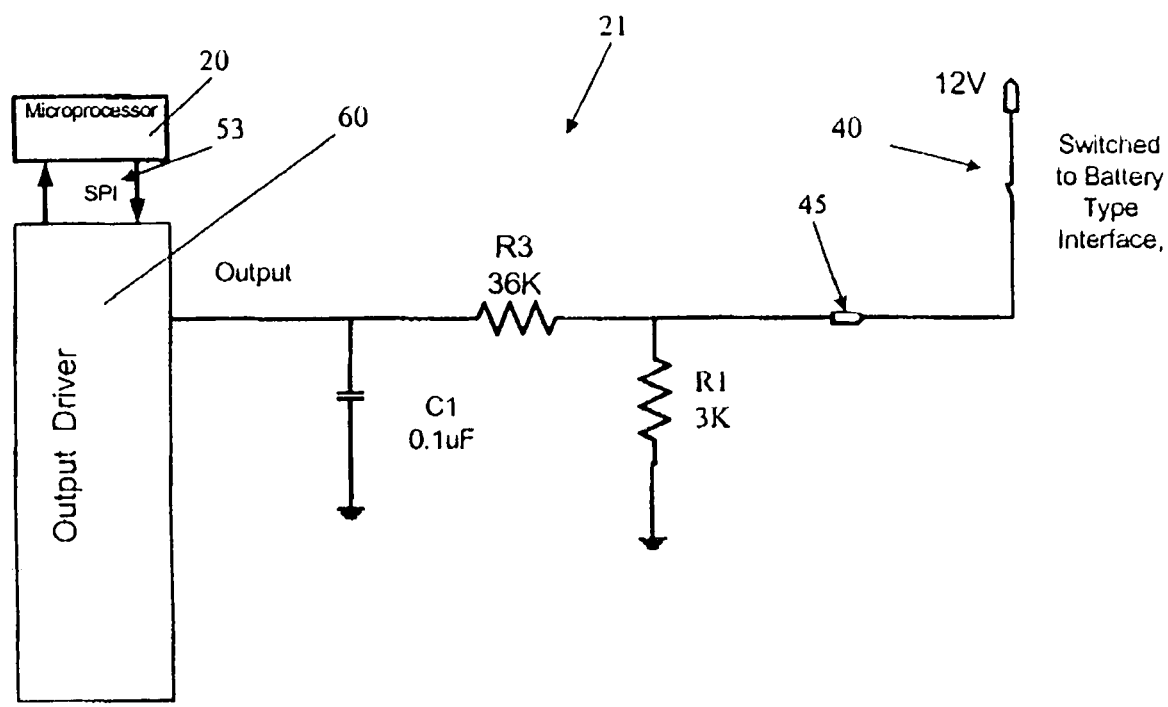
FIG. 6 is a dedicated discrete interface for a switched to battery type interface for use with a low-side output driver in accordance with the present invention.

FIG. 6 shows a dedicated discrete interface for a switched to battery type interface. As further explained by FIG. 6A, when the output is off and a fault is reported (fault="1"), switch 40 is read by SPI 53 as being open. In contrast, when no fault (fault="0") is reported, switch 40 is read by SPI 53 as being closed. The actual values of the resistors and capacitors of FIGS. 5 and 6 may change depending on interface design requirements.

Referring again to FIGS. 2 and 2A, the theory of operation of the present invention will be further described. To detect the closing of switch 30 in the switched to ground type interface, pre-FET gate drive 51 is set to "0". When gate drive 51 is "0", the drain feedback is expecting a high value, i.e., 12 Volts, for normal operation. Switching off transistor T1 artificially creates the normal operation mode. An open load/short to ground fault, i.e., fault="1", will be created when switch 30 is closed to ground. Thus, when switch 30 is closed to ground, the current to the integrated circuit will be cut and the interface will report an open/short to ground fault. In this way, the interface can detect the closing and opening of switch 30 by reading the fault values via SPI 53.

Referring still to FIGS. 2 and 2A, to detect the closing of switch 40 in the switched to battery type interface, pre-FET gate drive 51 is set to "1". When gate drive 51 is "1", the drain feedback is expecting a low value, i.e., less than the fault threshold voltage, for normal operation. Switching on transistor T1 artificially creates the normal operation mode. A short to battery fault, i.e., fault="1", will be created when switch 40 is closed to battery. Thus, when switch 40 is closed to battery, the drain voltage goes above the fault threshold setting and reports a fault (fault="1"). In this way, the interface can detect the closing and opening of switch 40 by reading the fault values via SPI 53.

The gate drive setting is different when a low side driver output is used to interface a discrete input interface. No external transistor T1 as in the case of the pre-FET driver of FIG. 2 is required in FIGS. 5 and 6. With a low-side driver output, however, only one type of switched arrangement, either a switched to battery or a switched to ground type interface, is possible.

Referring again to FIGS. 5 and 5A, the theory of operation of the present invention will be further described. When the low side driver output is commanded "OFF", the output pin is expecting a "high" signal for normal operation. When switch 30 is open, the low side driver output will see a "high" due to the pull-up of resistor R1, thus, no fault (fault="0") is reported. A fault condition will be created when switch 30 is closed. When switch 30 is closed, the pull-up of resistor R1 will be grounded through switch 30 and the low side output will go "low" and a fault will be reported (fault="1"). Thus, the interface can detect the closing of switch 30 by reading the fault value via SPI 53.

Referring again to FIGS. 6 and 6A, when the low-side driver output is commanded "OFF", the output pin is expecting a "high" signal for normal operation. When switch 40 is open, the low-side driver output will be "0" because of the pull-down provided by resistor R1. Thus, a fault will be reported (fault="1"). When switch 40 is closed, the output pin detects a "high" signal and the fault condition is removed (fault="0"). Thus, the interface can detect the closing of switch 40 by reading the fault value via SPI 53.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A method for design optimization of a processor to eliminate hardware proliferation using a processor having outputs with fault detection circuitry, comprising the steps of:
   associating a serial peripheral interface and a desired input with a spare output of an output driver of the processor;
   accessing the fault detection circuitry of the spare output through the serial peripheral interface to determine an input value; and
   determining a state of a switch based upon the determined input value.

2. The method of claim 1 wherein the fault detection circuitry is adapted to be coupled to a switched to battery type interface.

3. The method of claim 1 wherein the fault detection circuitry is adapted to be coupled to a switched to ground type interface.

4. The method of claim 1 wherein the fault detection circuitry includes latch circuitry.

5. The method of claim 1, wherein the state of the switch is one of open and closed.

6. A method for design optimization of a processor to eliminate hardware proliferation using a processor having outputs with fault detection circuitry, comprising the steps of:
   associating a serial peripheral interface and a desired input with a spare output of a pre-FET driver of the processor;
   determining an input value based on the fault detection circuitry through the serial peripheral interface of the pre-FET driver; and
   determining a state of a switch based upon the determined input value.

7. The method of claim 6 wherein the fault detection circuitry is adapted to be coupled to a switched to battery type interface.

8. The method of claim 6 wherein the fault detection circuitry is adapted to be coupled to a switched to ground type interface.

9. The method of claim 6 wherein the fault detection circuitry includes latch circuitry.

10. The method of claim 6, further comprising the step of toggling a gate in the pre-FET driver, thereby adding diagnostic capability.

11. The method of claim 6, wherein the step of determining the state of the switch utilizes a fault detection capability of the pre-FET driver to determine if the switch is one of open and closed.

12. A processor capable of utilizing outputs as input values comprising:
   processing circuitry coupled to a plurality of outputs, at least one of said outputs inducing fault detection circuitry;
   a serial peripheral interface coupled to a desired input;
   a connection between said at least one output having fault detection circuitry and the desired input; and
   means for determining the value of the desired input based on said serial peripheral interface and said connection, such that a state of a switch is determined.

13. The processor of claim 12 wherein said means for determining includes logic circuitry enabling a truth table.

14. The processor of claim 12 wherein said processing circuitry includes memory and said means for determining includes software stored in said memory.

15. The processor of claim 12 wherein said connection is adapted to be coupled to a switched to battery type interface.

16. The processor of claim 12 wherein said connection is adapted to be coupled to a switched to ground type interface.

17. The processor of claim 12 wherein said connection includes latch circuitry.

18. The processor of claim 12, wherein the state of the switch is one of open and closed.

* * * * *